(12) United States Patent
Nahill et al.

(10) Patent No.: US 6,811,845 B2
(45) Date of Patent: Nov. 2, 2004

(54) CONTAINER PREFORM ASSEMBLY AND METHOD OF MANUFACTURE

(75) Inventors: Thomas E. Nahill, Amherst, NH (US); W. Bruce Larsen, Holland, OH (US)

(73) Assignee: Continental Pet Technologies, Inc., Toledo, OH (US)

( * ) Notice: Subject to any disclaimer, the term of this patent is extended or adjusted under 35 U.S.C. 154(b) by 0 days.

(21) Appl. No.: 10/375,758

(22) Filed: Feb. 26, 2003

(65) Prior Publication Data

US 2004/0166265 A1 Aug. 26, 2004

(51) Int. Cl.[7] .................................................. B29C 17/07
(52) U.S. Cl. ....................... 428/35.7; 264/90; 264/97; 264/335; 264/533; 264/535; 428/542.8
(58) Field of Search ............... 428/35.7, 542.8; 264/90, 97, 335, 533, 535

(56) References Cited

U.S. PATENT DOCUMENTS

| | | |
|---|---|---|
| 3,124,273 A | 3/1964 | Remington |
| 3,603,472 A | 9/1971 | Lecinski |
| 3,899,096 A | 8/1975 | Marco |
| 4,293,520 A | 10/1981 | Akutsu |
| 4,341,317 A | 7/1982 | Suzuki |
| 4,607,757 A | 8/1986 | Lecinski |
| 5,833,085 A | 11/1998 | Valyi |
| 5,884,786 A | 3/1999 | Valyi |
| 2002/0037939 A1 * | 3/2002 | McKinnon .................... 521/40 |

* cited by examiner

*Primary Examiner*—Sandra M. Nolan

(57) ABSTRACT

A preform assembly for blow molding a container includes a molded plastic preform having a body and a neck with an external surface. The neck includes a plurality of spaced lands molded integrally with the neck and the body and defining the external surface of the neck, and a plurality of open spaces between the lands. A plastic finish ring is molded separately from the preform and is externally secured over the lands. The open spaces between the lands reduce heat transfer between the preform neck and the finish ring. In two exemplary embodiments of the invention, the lands include either spaced axial ribs or spaced circumferential ribs on the preform neck, and the open spaces include either spaced axial channels or spaced circumferential channels between the ribs.

18 Claims, 3 Drawing Sheets

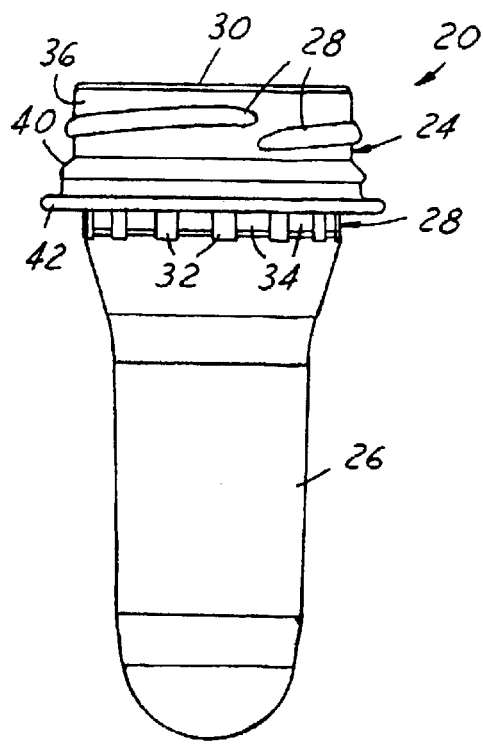
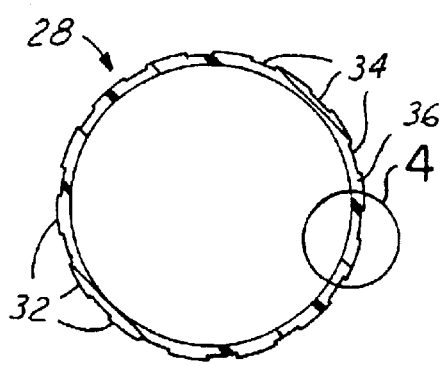
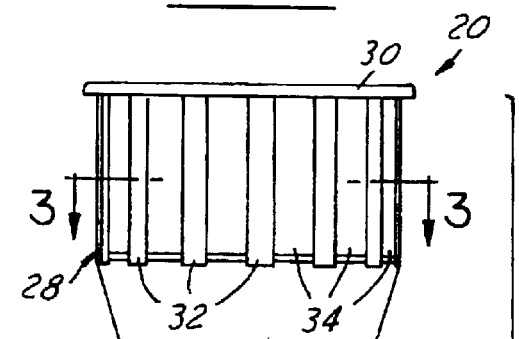
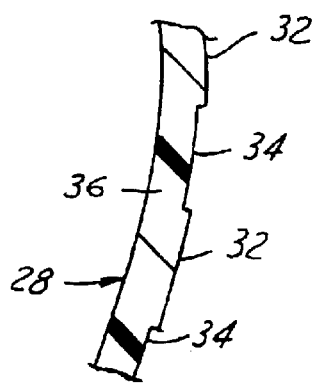
FIG.1
FIG.3
FIG.2
FIG.4

CONTAINER PREFORM ASSEMBLY AND METHOD OF MANUFACTURE

The present invention is directed to preforms for blow molding plastic containers, and to methods of making such preforms.

BACKGROUND AND SUMMARY OF THE INVENTION

In the manufacture of plastic containers, it is conventional to injection mold or compression mold a container preform having a body and a finish with one or more external threads. The finish typically is molded to its final geometry, while the body of the preform is subsequently blow molded to the desired geometry of the container body. The preform may be of monolayer construction, or may be of multilayer construction in which one or more intermediate layers in the preform body may or may not extend into the finish area of the preform. U.S. Pat. Nos. 4,609,516, 4,710,118 and 4,954,376 illustrate injection molding of multilayer container preforms.

Molding the finish portion of the container as part of the preform presents a number of problems. For example, when the preforms are formed by injection molding, the plastic material typically is injected into a mold cavity at the closed end of the preform body, so that the material must flow along the sides of the preform cavity into the area in which the finish is molded. The finish typically requires more accurate and stable dimensioning than the body of the preform, which may limit the cycle time of the molding process. Furthermore, the finish portion of the preform is of the same material as at least the outer layers of the preform body, which limits the ability to obtain the most desirable characteristics at the finish. When the preform is of polyester construction, such as polyethylene terephthalate (PET), the finish portion of the preform can be wholly or partially crystallized to improve the operating characteristics of the finish area, particularly in hot-fill container applications. However, the requirement that the finish be of the same material as at least the outer layers of the preform body still limits the design capabilities of preform manufacture.

A preform assembly for blow molding a container in accordance with a first aspect of the present invention includes a molded plastic preform having a body and a neck with an S external surface. A plastic finish ring is molded separately from the preform and has an internal surface. The finish ring is secured over the preform neck with the surfaces in facing engagement. One or both of the external and internal surfaces are defined by a plurality of spaced lands and a plurality of open spaces between the lands. The open spaces between the lands reduce heat transfer between the preform neck and the finish ring. In exemplary preferred embodiments of the invention, the lands include either spaced axial ribs or spaced circumferential ribs, and the open spaces include either spaced axial channels or spaced circumferential channels between the ribs.

BRIEF DESCRIPTION OF THE DRAWINGS

The invention, together with additional objects, features, advantages and aspects thereof, will be best understood from the following description, the appended claims and the accompanying drawings, in which:

FIG. 1 is an elevational view of a preform assembly in accordance with one exemplary presently preferred embodiment of the invention;

FIG. 2 is an exploded elevational view of the preform assembly illustrated in FIG. 1;

FIG. 3 is a sectional view taken substantially along the line 3—3 in FIG. 2;

FIG. 4 is a fragmentary sectional view on an enlarged scale of the portion of FIG. 3 within the area 4;

DETAILED DESCRIPTION OF PREFERRED EMBODIMENTS

Figure 5:
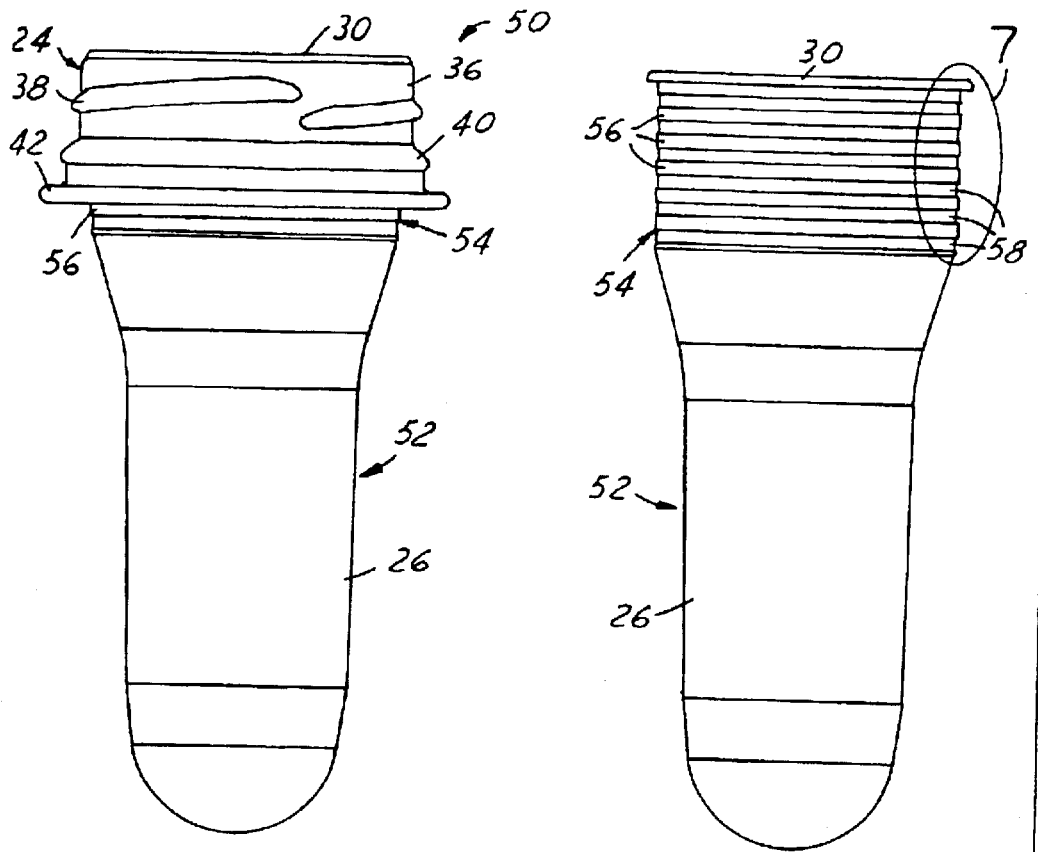
FIG. 5 is an elevational view of a preform assembly in accordance with a second exemplary preferred embodiment of the invention.

FIGS. 1–4 illustrate a preform assembly 20 in accordance with one exemplary presently preferred embodiment of the invention as including a preform 22 having a finish ring 24 externally secured thereto. Preform 22 includes a body 26 having a closed lower end. A neck 28 integrally extends from the upper end of body 26, and a flange 30 projects radially outwardly from the open upper end of neck 28, which surrounds the mouth of the preform. Neck 28 typically is cylindrical and preferably is coaxial with preform body 26. (Directional words such as "upper" and "lower" are employed by way of description and not limitation with respect to the upright orientation of the preform assemblies illustrated in the drawings. Directional words such as "radial" and "axial" are employed by way of description and not limitation with respect to the central axis of the preform neck or the finish ring as appropriate.) In the embodiment of FIGS. 1–4, neck 28 has a plurality of axially extending circumferentially spaced ribs 32 that extend throughout the axial length of the neck from flange 30 to where neck 28 blends into body 26. Ribs 32 are separated from each other by a corresponding plurality of axially extending circumferentially spaced channels 34. The outer surfaces of ribs 32 define an outer surface of neck 28, preferably being on a common cylinder of revolution coaxial with neck 28 and preform body 26.

Finish ring 24 includes an annular wall 36, on which at least one external thread or thread segment 38 is disposed. In the preferred embodiments of the invention illustrated in the drawings, finish ring 24 also includes an external bead 40 on wall 36 for cooperating with tamper indicating structure on a closure secured to the final container, and a capping flange 42 that extends radially outwardly from the lower end of wall 36. In assembly, finish ring 24 is assembled to preform 22 over ribs 32 of neck 28. The inside diameter of ring 24 preferably is coordinated with the outside diameter of ribs 32 such that ring 24 is secured to preform 22 by interference press fit over ribs 32. As an alternative, finish ring 24 may be secured to the preform neck by interference shrink fit, and securement may be supplemented by adhesive or ultrasonic welding if desired. The open spaces provided by channels 34 between the lands formed by ribs 32 help insulate finish ring 24 from heat within preform neck 28 during blow molding of the preform into a container, or during hot fill of the container with liquid product.

Figure 6:
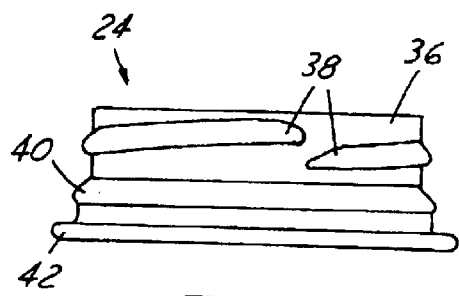
FIG. 6 is an exploded elevational view of the preform assembly illustrated in FIG. 5.
Figure 7:
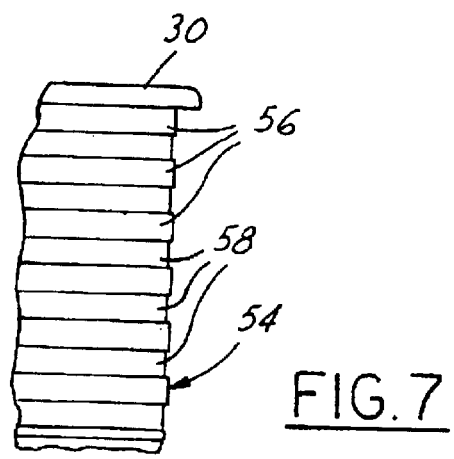
FIG. 7 is a fragmentary elevational view of the portion of FIG. 6 within the area 7.

FIGS. 5–7 illustrate a preform assembly 50 in accordance with a second exemplary preferred embodiment of the invention. Reference numerals in FIGS. 5–7 (and FIG. 8) that are identical to those employed in FIGS. 1–4 indicate correspondingly identical or similar components. Preform assembly 50 includes a preform 52 to which a finish ring 24 is externally secured. Preform 52 includes a body 26 with a closed lower end, a neck 54 integrally molded with body 26, and a flange 30 that extends radially outwardly from the open upper end of preform neck 54. The heat-insulating structure in the embodiment of FIGS. 5–7 includes lands on neck 54 formed by a plurality of circumferentially extending axially spaced ribs 56, and open spaces formed by a plurality of circumferentially extending axially spaced channels 58 between ribs 56. Ribs 56 define the outer surface of neck 54, preferably lying on a common cylinder of revolution coaxial with neck 54 and preform body 26. Once again, the open spaced provided by channels 58 help insulate finish ring 24 from heat in preform body 26 and neck 54. Finish ring 24 is secured to the outer surface of neck 54 as described above in connection with FIGS. 1–4.

Figure 8:
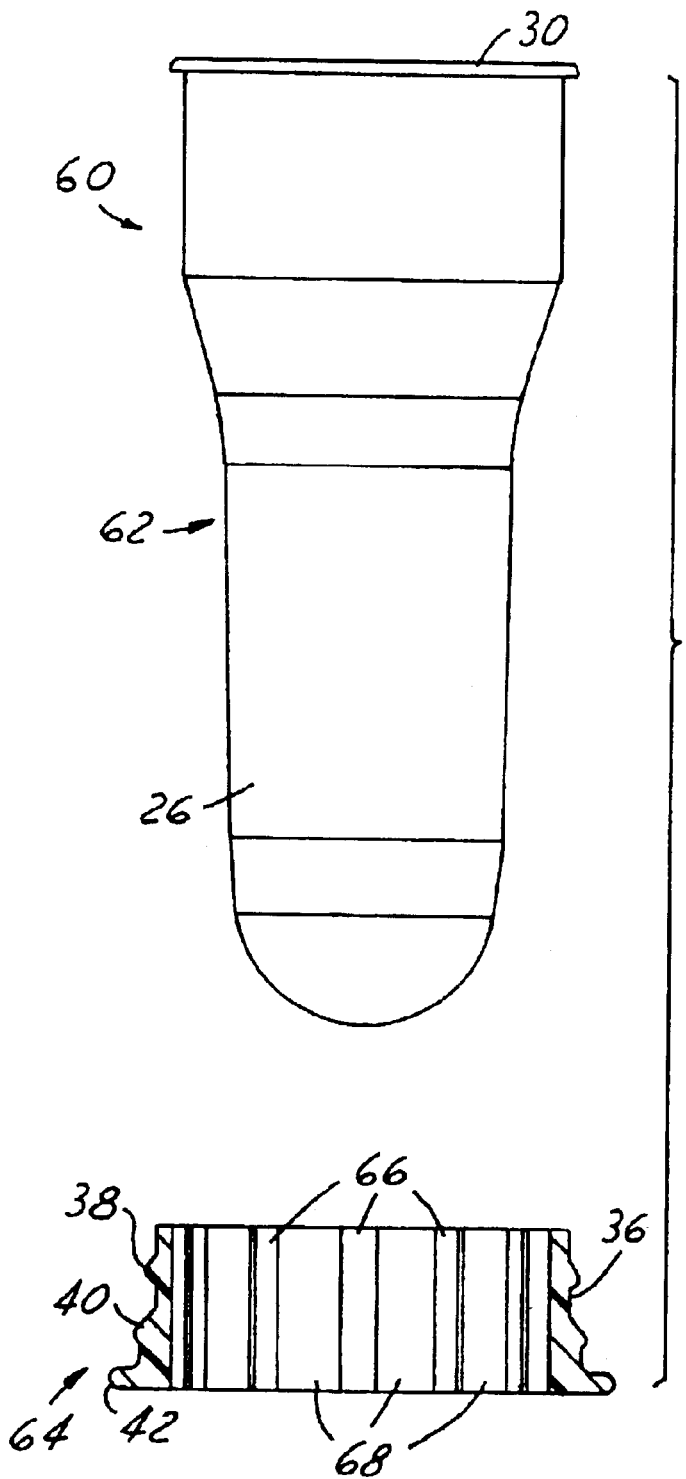
FIG. 8 is an exploded elevational view of a preform assembly in accordance with another embodiment of the invention.

FIG. 8 illustrates a preform assembly 60 as including a preform 62 and a finish ring 64. Preform assembly 60 is similar to assembly 20 in FIGS. 1–4, except that axially extending circumferentially spaced ribs 66 are provided on the inside surface of ring 64 rather than the outside surface of the preform neck. Ribs 66 are spaced from each other by axially extending channels 68. As an alternative to the embodiment of FIG. 8, spacer ribs could be provided on both the preform neck and the finish ring. The ribs on the preform neck would be orthogonal to the ribs on the preform neck. As another alternative to FIG. 8, ribs 66 could extend circumferentially around ring 64, rather than axially.

Preforms 22, 52, 62 may be of any suitable plastic construction, such as monolayer PET or multilayer construction of PET layers alternating with layers of barrier resin such as ethylene vinyl alcohol (EVOH) or nylon. Preforms 22, 52, 62 may be injection molded or compression molded. Likewise, finish rings 24, 64 may be of injection or compression molded plastic construction. By providing finish rings 24, 64 separate from preforms 22, 52, 62, the finish ring may be of any desired material construction, either the same as or more preferably different from the material construction of the preform. For example, the finish ring can be of PET, post consumer resin (PCR), process regrind (REG), polypropylene (PP), polyethylene (PE) or polyethylene naphthalate (PEN) construction. Where the finish ring is of polyester construction (e.g., PET, PEN or process regrind), the finish ring may be wholly or partially crystallized as molded. This may be accomplished by employing fast-crystallizing materials or suitably setting process conditions for manufacture of the finish ring, such as high mold temperature, slow mold cooling, heated areas in the mold cavity, etc. The finish ring alternatively may be wholly or partially crystallized in a post-molding operation. In other words, the material and conditions of fabrication of the finish ring may be selected separately from the material and manufacturing conditions of the preform to achieve desired operating characteristics at the finish area of the preform and the final container. Furthermore, the preform can be molded with thin wall sections without having to accommodate flow of material into a thicker finish area, which reduces material cost and mold cycle time. The finish ring is secured to the neck of the preform by interference fit (e.g., press fit or shrink fit), adhesive or welding. The presently preferred implementations of the invention involve interference press fit of the finish ring onto the neck of the preform. The finish ring and/or the preform neck can be provided with suitable means for preventing rotation of the ring on the neck.

There have thus been disclosed a preform assembly and method of manufacture that fully satisfy all of the objects and aims previously set forth. The invention has been disclosed in connection with three exemplary presently preferred embodiments, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A preform assembly for blow molding a container, which includes:
   a molded plastic preform having a body and a neck with an external surface,
   a plastic finish ring molded separately from said preform and having an internal surface,
   one or both of said internal and external surfaces having a plurality of spaced lands defining said surfaces, and a plurality of open spaces between said lands,
   said finish ring being externally secured over said neck with said external and internal surfaces in engagement, said open spaces between said lands reducing heat transfer between said neck and said ring.

2. The preform assembly set forth in claim 1 wherein said lands include axially extending circumferentially spaced ribs integrally molded with said neck or said ring, said open spaces including axially extending circumferentially spaced channels between said ribs.

3. The preform assembly set forth in claim 1 wherein said lands include circumferentially extending axially spaced ribs integrally molded with said neck or said ring, said open spaces including circumferentially extending axially spaced channels between said ribs.

4. The preform assembly set forth in claim 1 wherein said finish ring is externally secured to said cylindrical neck by interference fit, adhesive, or welding.

5. The preform assembly set forth in claim 1 wherein said plastic finish ring is of a different material construction from said plastic preform.

6. The preform assembly set forth in claim 1 wherein said plastic finish ring is of a construction selected from the group consisting of: PET, PP, PE, PEN, REG, PCR, and wholly or partially crystallized polyester.

7. A preform assembly for blow molding a container, which includes:
   a molded plastic preform having a body and a neck with an external surface,
   said neck including a plurality of spaced lands molded integrally with said neck and body and defining said external surface of said neck, and a plurality of open spaces between said lands, and
   a plastic finish ring molded separately from said preform and externally secured over said lands, said open spaces between said lands reducing heat transfer between said neck and said ring.

8. The preform assembly set forth in claim 7 wherein said lands include axially extending circumferentially spaced ribs integrally molded with said neck and defining said outer surface coaxially with said neck, said open spaces including axially extending circumferentially spaced channels between said ribs.

9. The preform assembly set forth in claim 7 wherein said lands include circumferentially extending axially spaced ribs integrally molded with said neck and defining said outer surface coaxially with said neck, said open spaces including circumferentially extending axially spaced channels between said ribs.

10. The preform assembly set forth in claim 7 wherein said finish ring has at least one external thread and an external capping flange at one axial end of said ring.

11. The preform assembly set forth in claim 7 wherein said finish ring is externally secured to said cylindrical neck by interference fit, adhesive, or welding.

12. The preform assembly set forth in claim 7 wherein said plastic finish ring is of a different material construction from said plastic preform.

13. The preform assembly set forth in claim 7 wherein said plastic finish ring is of a construction selected from the group consisting of: PET, PP, PE, PEN, REG, PCR, and wholly or partially crystallized polyester.

14. A method of making a preform assembly for blow molding a container, which includes the steps of:
   (a) molding a plastic preform having a body and a neck with an external surface,
   (b) molding a plastic finish ring separately from said preform and having an inside surface,
   (c) molding a plurality of spaced lands on said neck in said step (a) to define said external surface, and/or molding a plurality of spaced lands on said ring in said step (b) to define said inside surface, and
   (d) externally securing said ring over said neck with said surfaces in engagement, such that open spaces between said lands reduce heat transfer between said neck and said ring.

15. The method set forth in claim 14 wherein said step (d) is carried out by interference fit, adhesion or welding.

16. A method of making a preform assembly for blow molding a container, which includes the steps of:
   (a) molding a preform having a body and a neck with an external surface, said neck including a plurality of spaced lands molded integrally with said neck and body and defining said external surface of said neck, and a plurality of open spaces between said lands,
   (b) molding a plastic finish ring separately from said preform, and
   (c) externally securing said finish to said lands, said open spaces between said lands reducing heat transfer between said neck and said ring.

17. The method set forth in claim 16 wherein said step (c) is carried out by interference fit, adhesion or welding.

18. The method set forth in claim 16 wherein said plastic finish ring is of polyester construction, and wherein said step (b) includes wholly or partially crystallizing said finish ring prior to-said step (c).

* * * * *